United States Patent
Fujimori et al.

(10) Patent No.: US 6,906,840 B1
(45) Date of Patent: Jun. 14, 2005

(54) OPTICAL MODULATOR, OPTICAL DEVICE HAVING THE OPTICAL MODULATOR AND PROJECTOR HAVING THE SAME

(75) Inventors: Motoyuki Fujimori, Suwa (JP); Yoshiyuki Yanagisawa, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 10/645,903

(22) Filed: Aug. 22, 2003

(30) Foreign Application Priority Data

Aug. 27, 2002 (JP) ..................... 2002-247432
Jun. 27, 2003 (JP) ..................... 2003-184236

(51) Int. Cl.[7] ............ G02B 26/00; G02F 1/03; G02F 1/1335; G02F 1/1333; G03B 21/16
(52) U.S. Cl. ............... 359/237; 359/240; 359/245; 349/5; 349/58; 349/161; 353/52
(58) Field of Search .............. 359/237, 240, 359/245, 248, 246, 249, 259, 288, 618; 353/52, 57, 60; 349/5, 58, 72, 161

(56) References Cited

U.S. PATENT DOCUMENTS 6,392,780 B1 * 5/2002 Fujimori .............. 359/246

2002/0089612 A1 * 7/2002 Okada et al. ............ 349/5

FOREIGN PATENT DOCUMENTS

JP    A 11-160788    6/1999
JP    A 2003-121937  4/2003

* cited by examiner

Primary Examiner—Hung Xuan Dang
Assistant Examiner—Joseph Martinez
(74) Attorney, Agent, or Firm—Oliff & Berridge, PLC

(57) ABSTRACT

A liquid crystal panel modulates a light beam irradiated by a light source in accordance with image information, which includes a liquid crystal panel body having a pair of transparent substrates between which electro-optic material is sealed, and a holding frame of approximately C-shaped cross section having a base portion provided with an opening corresponding to an image formation area of the liquid crystal panel and a pair of lateral portions vertically provided on opposing sides of the base portion, the holding frame accommodating the liquid crystal panel body thereinside.

27 Claims, 9 Drawing Sheets

OPTICAL MODULATOR, OPTICAL DEVICE HAVING THE OPTICAL MODULATOR AND PROJECTOR HAVING THE SAME

BACKGROUND OF THE INVENTION

1. Field of the Invention

The present invention relates to an optical modulator, an optical device having the optical modulator and a projector having the optical modulator or the optical device.

2. Description of Related Art

Conventionally, a three-plate projector having an optical device including a color separating optical system for separating a light beam irradiated by a light source lamp into three color lights of R, G and B using a dichroic mirror, three optical modulators such as liquid crystal panel for independently modulating the separated light beams in accordance with image information and an color synthesizing optical device such as a cross dichroic prism for synthesizing the light beams modulated by the liquid crystal panels has been known.

The optical device used for such three-plate projector is constructed by bonding and fixing the liquid crystal panel on the light-incident side of prism through a wedge-shaped spacer or a pin spacer (see Japanese Patent Laid-Open Publication No. Hei 11-160788 and Japanese Patent Laid-Open Publication No. 2003-121937). Since the liquid crystal panel of such optional device is directly bonded and fixed on the prism, there is no need for providing an independent support for the liquid crystal panel, so that the size of the projector can be greatly reduced.

In such optical device, an optical converter having a substrate with an optical conversion film such as polarization film and vision-angle correcting film has to be interposed between the light-incident side of the prism and the liquid crystal panel and both of the liquid crystal panel and the optical converter have to be efficiently cooled.

Accordingly, an arrangement has been proposed, where a base made of heat-conductive material such as metal is bonded on at least one of the sides intersecting a plurality of light-incident sides of the prism and the heat generated on the optical converter and the liquid crystal panel is absorbed by the base which is forcibly cooled, thereby efficiently cooling the optical converter and the liquid crystal panel.

However, since the optical converter is bonded on the base and the liquid crystal panel is bonded and fixed thereon through a spacer, when there is difference between the heating condition of the optical converter or the liquid crystal panel, the heat is transferred to one of the optical converter and the liquid crystal panel to the other, so that both of the components cannot be efficiently cooled.

Further, in such arrangement where the optical modulator such as liquid crystal panel ia bonded and fixed on the optical converter through a spacer, since sufficient gap cannot be retained between the light-incident side of the prism and the liquid crystal panel, cooling efficiency may be deteriorated.

SUMMARY OF THE INVENTION

An object of the present invention is to provide an optical modulator capable of efficiently cooling both of the optical converter and the optical modulator, an optical device having the optical modulator and a projector having the optical modulator or the optical device.

In order to attain the above object, an optical modulator according to an aspect of the present invention is for modulating a light beam irradiated by a light source in accordance with image information, the optical modulator including an optical modulator body having a pair of transparent substrates between which an electro-optic material is sealed; and a bolding frame that houses the optical modulator body thereinside, the holding frame having an approximately C-shaped cross section constructed by a portion having an open corresponding to an image formation area of the optical modulator body and a pair of lateral portion vertically provided on opposing sides of the base portion.

According to the above arrangement, the optical modulator body is accommodated within the holding frame having the pair of lateral portions and is spaced apart from the optical converter by the lateral portion. Accordingly, the optical modulator can be efficiently cooled by cooling air flowing between the optical modulator and the optical converter.

Further, since the optical converter does not touch the optical modulator by the provision of the holding frame having the pair of lateral portions, heat is not directly transmitted between the components, thus efficiently cooling the optical modulator.

In the above arrangement, a frame member may preferably be disposed on a light-irradiation side of the optical modulator body and having an opening corresponding to the image formation area of the optical modulator body, the frame member having a pair of bent portions formed at a position opposing the pair of lateral portion, the lateral portions and the bent portions being abutted and bonded.

According to the above arrangement, since the heat generated on the optical modulator body is transmitted to the frame member and the heat can be released to the holding frame through the bent portion of the frame member, the optical modulator body can be efficiently cooled.

In the optical modulator according to the above aspect of the present invention, a dustproof glass that prevents adhesion of dust may preferably be closely attached to a light-incident side and/or the light-irradiation side of the optical modulator body, the dustproof glass being made of a heat-conductive transparent material.

According to the above arrangement, since the dustproof glass is made of heat-conductive transparent material, the heat generated by the optical modulator body can be released to the holding frame through the dustproof glass, so that the optical device body can be efficiently cooled.

In the optical modulator according to the above aspect of the present invention, at least three incident-side dustproof glass position for the dustproof glass on the light-incident side may preferably be provided around the opening of the holding frame.

The incident-side dustproof glass positioners may preferably be a pin or a dowel.

According to the above arrangement, since at least three incident-side dustproof glass positioners are provided around the opening, no assembly jig etc. is required in adjusting the mutual position of the optical modulator body, the incident-side dustproof glass and the holding frame. Accordingly, the optical modulator body and the holding frame can be easily aligned.

In the optical modulator according to the above aspect of the present invention, the incident-side dustproof glass positioner may preferably include two first positioners located on a downstream of a cooling air introduced from the outside of the optical modulator to be in contract with the surface of the dustproof glass on the light-incident side, and a second positioner to be in contact with a side of the light-incident side dustproof glass orthogonal to the surface of the light-incident dustproof glass touching the first positioners.

According to the above arrangement, since the first positioner touches the surface of the dustproof glass and the second positioner touches the side of the light-incident dustproof glass orthogonal to the surface on which the first positioner touches, the position of the dustproof glass can be bidirectionally determined, thereby securely positioning and fixing the dustproof glass.

Since the first positioner is located on the downstream of the cooling air introduced from the outside of the optical modulator, the flow of the cooling air is not blocked, thus efficiently cooling the optical modulator body.

In the optical modulator according to the above aspect of the present invention, the incident-side dustproof glass positioner may preferably have a thickness not less than the sum of the half of the thickness of the transparent substrate located on the light-incident side and the thickness of the dustproof glass and less than the sum of the thickness of the transparent substrate and the thickness of the incident-side dustproof glass.

According to the above arrangement, since the incident-side dustproof glass positioner is capable of being abutted to both of the transparent substrate and the light-incident side dustproof glass, the position of the transparent substrate and the dustproof glass is not shifted.

In the optical modulator according to the above aspect of the present invention, at least three irradiation-side dustproof positioners for the dustproof glass on the light-irradiation side may preferably be provided around the opening of the frame member.

According to the above arrangement, since at least three irradiation-side dustproof positioners for the dustproof glass on the light-irradiation side are provided around the opening, no assembly jig is necessary in adjusting the relative position of the optical modulator body and the light-incident side dustproof glass and the holding frame. Accordingly, the position of the optical modulator body and the holding frame can be easily adjusted.

In the optical modulator according to the above aspect of the present invention, the irradiation-side dustproof positioner may preferably include two first positioners located on a downstream of a cooling air introduced from the outside of the optical modulator to be in contact with the surface of the light-irradiation side dustproof glass and a second positioner to be in contact with a side of the light-irradiation side dustproof glass orthogonal with the surface of the light-irradiation side dustproof glass touching the first positioners.

According to the above arrangement, since the first positioner is in contact with one of the surfaces of the dustproof glass and the second positioner is in contact with the side orthogonal with the surface of the light-incident side dustproof glass to which the first positioner touches, the position of the dustproof glass can be bidirectionally determined, so that the dustproof glass can be securely positioned and fixed.

Since the first positioner is located on the downstream of the cooling air introduced from the outside of the optical modulator body, the flow of the cooling air is not blocked, so that the optical modulator body can be efficiently cooled.

In the optical modulator according to the above aspect of the present invention, the thickness of the irradiation-side dustproof glass positioner may preferably be not less than the sum of half of the thickness of the transparent substrate located on the light-irradiation side and the thickness of the light-irradiation side dustproof glass and may preferably be less than sum of the thickness of the transparent substrate and the thickness of the light-irradiation side dustproof glass.

According to the above arrangement, since the incident-side dustproof glass positioner can touch both of the transparent substrate and the light-incident dustproof glass, the position between the transparent substrate and the dustproof glass is not shifted.

In the optical modulator according to the above aspect of the present invention, a bent rib bent toward the inside of the holding frame may preferably be formed on a distal end of the lateral portion of the holding frame.

According to the above arrangement, the contact area between the holding frame and the other components can be increased by the bent rib portion. Accordingly, the heat generated on the optical modulator body can be released to the outside of the optical modulator in an efficient manner, thus efficiently cooling the optical modulator.

In the optical modulator according to the above aspect of the present invention, an elongated hole extending from the lateral portion to the bent rib may preferably be formed approximately at the center of the holding frame.

According to the above arrangement, even when the holding frame is expanded on account of the heat from the outside, since the stress caused by heat can be reduced by the elongated hole, the stress is not applied on the optical modulator body inside the holding frame.

In the optical modulator according to the above aspect of the present invention, a pair of notched grooves spaced apart along the extending direction of the bent rib may preferably be formed on the distal end of the bent rib, the pair of notched grooves determining a location of an optical converter disposed on a downstream of the optical modulator, the optical converter optically converting the irradiated light beam.

According to the above arrangement, the position of the optical converter relative to the optical modulator is determined by the pair of notched grooves. Accordingly, no jig etc. is required in adjusting the position of the components, thereby simplifying the production process.

An optical device according to another aspect of the present invention has: a plurality of optical modulators that respectively modulate a plurality of color lights in accordance with image information; a color synthesizing optical device having a plurality of light-incident sides opposing the respective optical modulators, the color synthesizing optical device synthesizing the respective color lights modulated by the respective optical modulators; a base made of heat-conductive material fixed on at least one of sides of the color synthesizing optical device intersecting the plurality of light-incident sides of the color synthesizing optical device; and an optical converter interposed between the optical modulator and the light-incident side, the optical converter having an end attached to the base and an optical conversion film provided on a substrate, the optical conversion film optically converting the color light irradiated by the optical modulator, in which the optical modulator is in the above-described optical modulator.

According to the above arrangement, the same function and advantage as the above-described optical modulator can be obtained since the above-described optical modulator is used. Accordingly, an optical device capable of efficiently cooling both of the optical converter and the optical modulator can be provided.

In the optical device according to the above aspect of the present invention, the base may preferably have a plate-shaped base body disposed on the side of the color synthesizing optical device and a plurality of ribs formed by bending sides of the base body along the light-incident sides of the color synthesizing optical device on which the optical modulator is attached at a plurality of locations, and one or more slit that divides a plurality of attachment surfaces of the optical modulator may preferably be formed on a distal end of the projection of the respective ribs.

According to the above arrangement, even when the base is expanded by external heat, since the stress on account of the heat can be reduced by the slit, relative position between the optical converter and the optical modulator connected to the base is not shifted. Accordingly, position shift of the optical modulator etc. relative to the light-incident surface can be securely prevented.

In the optical device according to the above aspect of the present invention, an elongated hole extracting along the bent portion of the rib may preferably be formed on the base.

According to the above arrangement, since the cooling air from the outside of the optical device can flow through the elongated hole, the optical device can be efficiently cooled.

In the optical device according to the above aspect of the present invention, the optical converter may preferably be attached to the rib on the inside of the attachment surfaces of the optical modulator, and the external end of the elongated hole may preferably be bent in a direction for the rib to be projected along the end of the attached optical converter.

According to the above arrangement, since the external end of the elongated hole is bent along the end of the attached optical converter in a direction for the rib to be projected, the external end of the elongated hole divides the attachment surface of the optical converter and the attachment surface of the holding frame, so that the heat transfer between the optical converter and the optical modulator can be reduced.

In the optical device according to the above aspect of the present invention, the base may preferably have at least two attachments used for fixing the base to an optical component casing in which an illuminating optical axis of the light beam irradiated by the light source is set and the optical device is accommodated and disposed at a predetermined position on the illuminating optical axis.

The attachment may be arranged as a screw hole formed on the base or an arm-shaped component stretching from a side of the color synthesizing optical device to which the base is fixed.

According to the above arrangement, since at least two attachments are provided, the contact area between the optical device and the optical component casing can be increased, so that the heat generated on the optical device can be efficiently released to the optical component casing, thus efficiently cooling the optical device.

In the optical device according to the above aspect of the present invention, one of the attachments may preferably be provided approximately at the center of a first side of the base and may preferably be respectively provided on corners of a second side opposing the first side.

According to the above arrangement, since the optical device is attached to the optical component casing at three points by the attachment, the optical device can be securely fixed to the optical casing.

In the optical device according to the above aspect of the present invention, the base may preferably be a block member having a plurality of surfaces on which the optical modulator and the optical converter are attached.

According to the above arrangement, since the heat generated on the optical converter and the optical modulator can be released by the base, the optical converter and the optical modulator can be efficiently cooled.

In the optical device according to the above aspect of the present invention, the optical modulator may preferably be bonded on the surface of the base at a plurality of locations, and a groove extending along the side of the color synthesizing optical device on which the base is fixed and having an end dividing the plurality of surfaces for the optical modulator to be attached may preferably be formed on the base.

According to the above arrangement, even when the base is expanded by external heat, the stress caused by the heat is reduced by the groove dividing the plurality of attachment surfaces of the optical modulator, so that the relative position of the optical converter and the optical modulator does not shift. Accordingly, position shift of the optical modulator etc. relative to the light-incident side can be securely prevented.

In the optical device according to the above aspect of the present invention, the optical converter may preferably be attached to the base between the plurality of surfaces on which the optical converter is attached, and a second groove extending along the side of the color synthesizing optical device on which the base is fixed and having an end dividing the attachment surface of the optical modulator and the attachment surface of the optical converter may preferably be formed on the base.

According to the above arrangement, since the second groove divides the attachment surface of the optical modulator and the attachment surface of the optical converter, the optical converter does not directly touch the optical modulator. Accordingly, direct heat transfer between the optical converter and the optical modulator can be prevented, thus efficiently cooling the optical converter and the optical modulator.

In the optical device according to the above aspect of the present invention, the base may preferably have a guide hole and a screw hole for the base to be guided and fixed to an optical component casing in which an illuminating optical axis of the light beam irradiated by the light source is set and the optical device is accommodated and disposed at a predetermined position on the illuminating optical axis, and the screw hole may preferably be formed approximately at the center of the base.

According to the above arrangement, since the optical device is guided to a predetermined position inside the optical component casing by the guide hole and is screwed to the optical component casing through the screw hole, thus securely positioning and fixing the optical device to the optical component casing.

In the optical device according to the above aspect of the present invention, the substrate may preferably be provided with a plating layer adapted to soldering at least on a surface opposing the base.

According to the above arrangement, since the heat generated on the optical converter can be released to the base through the substrate closely fixed to the base, the optical converter can be further efficiently cooled.

In the optical device according to the above aspect of the present invention, the plating layer may preferably be made of a field-free nickel-phosphorus plating layer and a solder-plating layer.

According to the above arrangement, since the thickness of the field-free nickel-phosphorus plating layer can be made uniform, the layer is not broken away even when the layer is formed on a component having complicated shape such as the holding frame. Accordingly, anti-corrosion and anti-friction properties can enhanced by the uniform thickness.

In the optical device according to the above aspect of the present invention, the substrate may preferably be made of a material with heat-conductivity of 10 W/(m·K) or more.

When the substrate is made of a material having heat conductivity less than 10W//(m·K), the heat generated on the optical device may not be sufficiently transferred to the base.

A projector according to still another aspect of the present invention modulates a light beam irradiated by a light source in accordance with image information and forms an optical image to project the optical image in an enlarged manner, the projector including the optical modulator or the optical device according to the above aspect of the present invention.

According to the above arrangement, the same function and advantage as the above aspects of the present invention can be obtained.

DETAILED DESCRIPTION OF PREFERRED EMBODIMENT(S)

[1. First Embodiment]

A projector according to first embodiment of the present invention will be described below with reference to attached drawings.

[1-1. Primary Arrangement of Projector]

Figure 1:
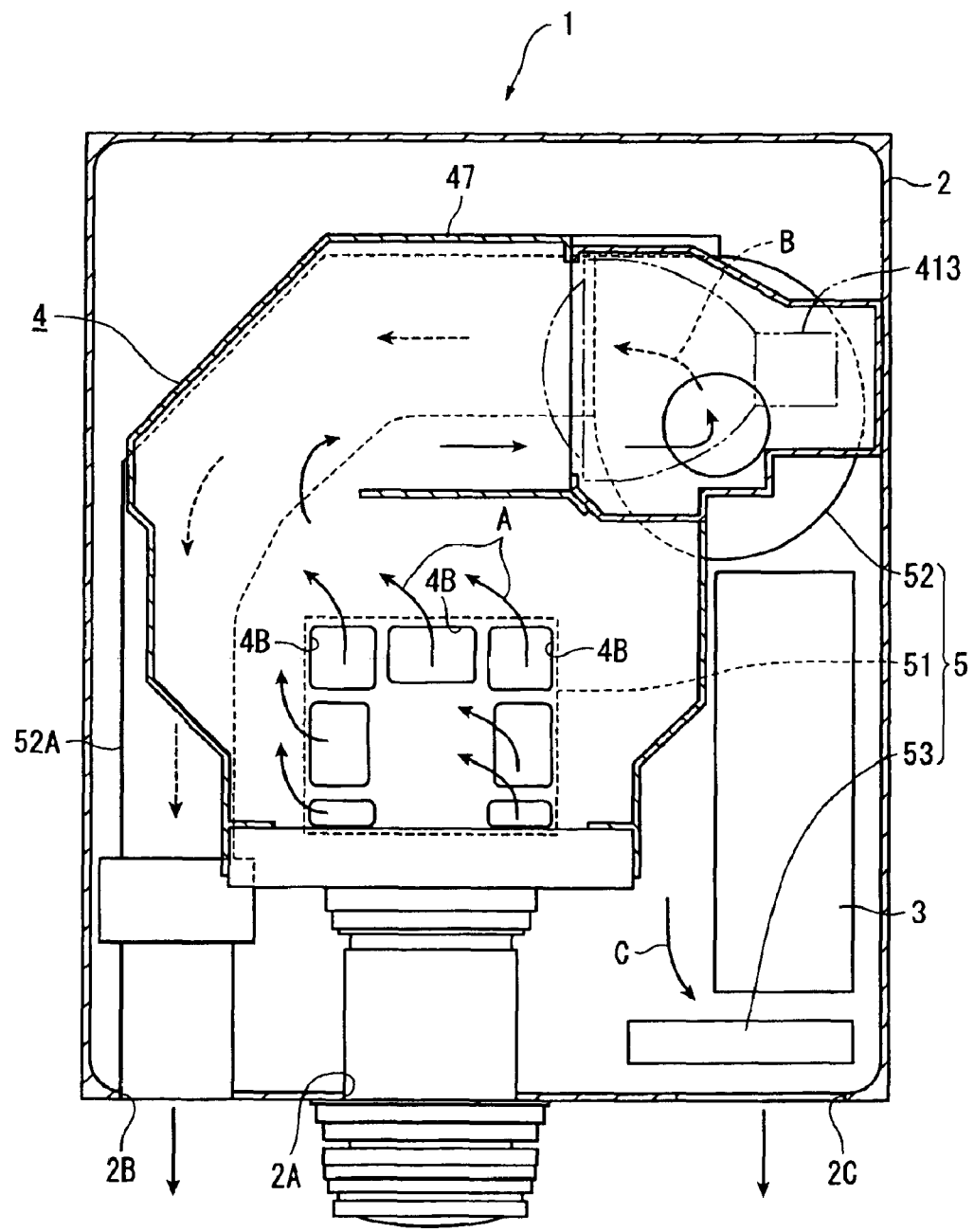
FIG. 1 is a plane view schematically showing an interior of a projector according to a first embodiment of the present invention.

FIG. 1 is a plane view schematically showing the interior arrangement of a projector 1 according to first embodiment of the present invention. The projector 1 has an approximately rectangular parallelepiped exterior case 2 made of resin, an optical unit 4 for optically processing a light beam irradiated by a light source 413 to form an optical image in accordance with image information, a cooling unit 5 for releasing the heat generated inside the projector 1 toward the outside, and a power source unit 3 for supplying electric power supplied from the outside of the units 4 and 5.

The exterior case 2 houses the units 3 to 5, which, though not specifically illustrated, includes an upper case constituting the upper side, font side and lateral side of the projector 1 and a lower case constituting the bottom side, lateral side and rear side of the projector.

As shown in FIG. 1, a cut 2A is formed on the front side of the exterior case 2. A part of the optical unit 4 accommodated in the exterior case 2 is exposed to the outside through the cut 2A. Exhaust holes 2B and 2C for discharging the air inside the projector 1 are formed on both sides of the cut 2A on the front side of the exterior case 2. An intake hole (not shown) for drawing in a cooling air from the outside is formed on the bottom side of the exterior case at a position corresponding to below-described optical device 44 of the optical unit 4.

As shown in FIG. 1, the power source unit 3 is disposed on the right side (in FIG. 1) of the optical unit 4 in the exterior case 2. Though not specifically illustrated, the power source unit 3 supplies the electric power supplied through a power cable plugged into an inlet connector to a lamp drive circuit (ballast) and a driver board (not shown).

The lamp drive circuit supplies the supplied electric power to a light source lamp 411 of the optical unit 4. Though not illustrated, the driver board is disposed above the optical unit 4, which conducts image processing of the inputted image information and controls below-described liquid crystal panels 441R, 441G and 441B.

The power source unit 3 and the optical unit 4 are covered with shield plate made of metal such as aluminum and magnesium. The lamp drive circuit and the driver board are also covered with a shield plate made of metal such as aluminum or magnesium. Accordingly, leakage of electromagnetic noise from the power source unit 3 or the driver board to the outside is prevented.

The cooling unit 5 draws in the cooling air into the channel inside the projector 1 to absorb the heat generated inside the projector 1 by the cooling air and discharges the heated cooling air to the outside, cooling the interior of the projector 1. The cooling unit 5 includes an axial-flow intake fan 51, a sirocco fan 52 and an axial-flow exhaust fan 53.

The axial-flow intake fan 51 is disposed below an optical device 44 of the optical unit 4 and above the inhale hole of the exterior case 2. The axial-flow intake fan 51 draws in the cooling air from the outside into the optical unit 4 through the intake hole to cool the optical device 44.

The sirocco fan 52 is disposed below the light source 413 of the optical unit 4. The sirocco fan 52 draws the cooling air inside the optical unit taken in by the axial-flow intake fan 51 while removing the heat of the light source 413 and discharges the heated cooling air from an exhaust hole 2B toward the outside through a duct 52A disposed below the optical unit 4.

The axial-flow exhaust fan 53 is disposed between an exhaust hole 2C formed on the front side of the exterior case 2 and the power source unit 3. The axial-flow exhaust fan 53 draws in the air around the power source unit 3 being heated by the power source unit 3 and discharges the air to the outside through the exhaust hole 2C.

[1-2. Arrangement of Optical Unit]

Figure 2:
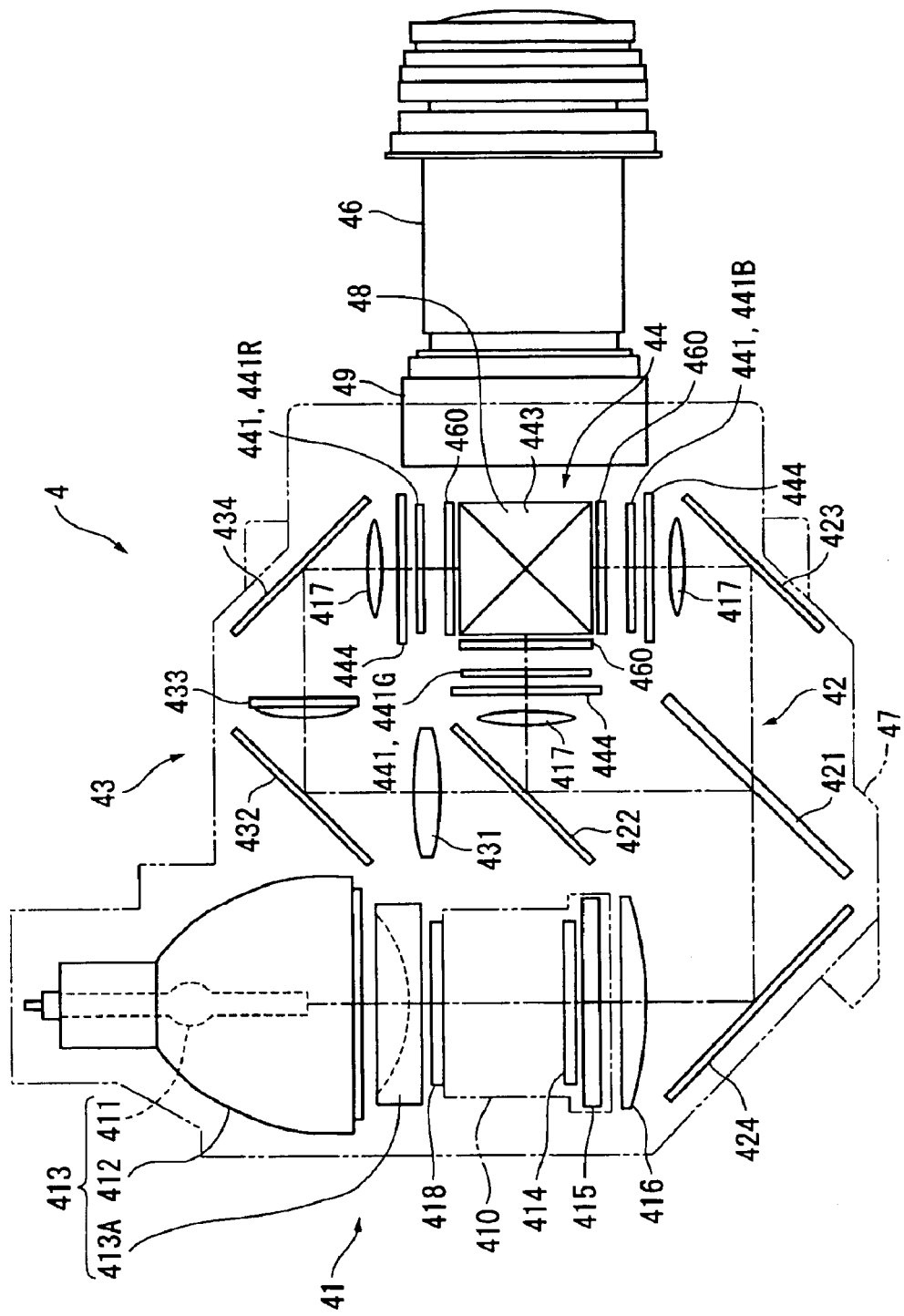
FIG. 2 is a schematic plane view showing an optical unit of the first embodiment.

FIG. 2 is a plane view schematically showing the optical unit 4.

As shown in FIG. 2, the optical unit 4 is formed in an approximately planarly-viewed L-shape and optically processes the light beam irradiated by the light source lamp 411 to form an optical image corresponding to image information, which includes an integrator illuminating optical system 41, a color separating optical system 42, a relay optical system 43, the optical device 44 and a projection lens 46 as a projection optical system. The optical components 41 to 44 and 46 are housed and fixed on a light guide 47 as an optical component casing.

As shown in FIG. 2, the integrator illuminating optical system 41 is an optical system for approximately uniformly illuminating the image formation area of the three liquid crystal panels 441 (the liquid crystal panels 441R, 441G and 441B for respective red, green and blue color lights) of the optical device 44, which includes a light source 413, a first lens array 418, a second lens array 414, a polarization converter 415 and a superposing lens 416.

The light source 413 has a light source lamp 411 for irradiating radial beam, an ellipsoidal mirror 412 for reflecting the radial beam irradiated by the light source lamp 411, and a parallelizing concave lens 413A for parallelizing the light irradiated by the light source lamp 411 and reflected by the ellipsoidal mirror 412. Incidentally, not-illustrated UV filter is provided on planar portion of the parallelizing concave lens 413A. Halogen lamp, metal halide lamp and high-pressure mercury lamp are often used as the light source lamp 411. A parabolic mirror may be used instead of the ellipsoidal mirror 412 and the parallelizing concave lens 413A.

The first lens array 418 is made of small lenses having approximately rectangular profile being seen in optical axis direction, the lenses being arranged in a matrix. The lenses split the light beam irradiated by the light source lamp 411 into a plurality of sub-beams. The profile of the lenses is substantially similar to the profile of the image formation area of the liquid crystal panel 441. For instance, when the aspect ratio (ratio of horizontal and vertical dimensions) of the image formation area of the liquid crystal panel 441 is 4:3, the aspect ratio of the lenses area also set at 4:3.

The second lens array 414 is arranged approximately the same as the first lens array 418, which has a matrix arrangement of small lenses. The second lens array 414 focuses the image of the respective small lenses of the first lens array 418 onto the liquid crystal panel 441 together with the superposing lens 416.

The polarization converter 415 is disposed between the second lens array 414 and the superposing lens 416 and is integrated with the second lens array 414 as a unit. The polarization converter 415 converts the light from the second lens array 414 into a uniform polarized light to enhance light utilization efficiency of the optical driver device 44. As shown in double-dotted line 410 in FIG. 2, the integrated polarization converter 415 and the second lens array 414 and the first lens array 418 are also integrated as a unit.

Specifically, the respective sub-beams converted into a uniform polarized light by the polarization converter 415 is substantially superposed on the liquid crystal panels 441R, 441G and 441B of the optical device 44 by the superposing lens 416. Since the projector 1 (optical device 44) using the liquid crystal panel 441 for modulating the polarized light can utilize only one type of polarized light, approximately half of the light from the light source lamp 411 also emitting other random polarized light cannot be used. With the use of the polarization converter 415, all of the light irradiated by the light lamp 411 is converted into a uniform polarized light to enhance the light utilization efficiency of the optical device 44. Incidentally, such polarization converter 415 is disclosed in, for instance, Japanese Patent Laid-Open Publication No. Hei 8-304739.

The color separating optical system 42 has to dichroic mirrors 421 and 442, and reflection mirrors 423 and 424, which separates the plurality of sub-beams irradiated by the integrator illuminating optical system 41 into three color lights of red, green and blue.

The relay optical system 43 has an incident-side lens 431, a relay lens 433 and reflection mirrors 423 and 434, which guides the color lights (red light) separated by the color separating optical system 42 to the liquid crystal panel 441R.

In such optical system 4, the blue color component of the light beam irradiated by the integrator illuminating optical system 41 transmits through the dichroic mirror 421 of the color separating optical system 42 and the red and green color components of the light beam are reflected by the dichroic mirror 421. The blue color component having passed through the dichroic mirror 421 is reflected by the reflection mirror 423 to reach the liquid crystal panel 441B for blue color through a field lens 417. The field lens 417 converts the respective sub-beams irradiated by the second lens array 414 into a light beam parallel to the central axis (main beam) of the sub-beams. The field lenses 417 provided on the light-incident side of the other liquid crystal panels 441R and 441G work in the same manner.

In the red light and the green light reflected by the dichroic mirror 421, the green light is reflected by the dichroic mirror 422 to reach the liquid crystal panel 441G for green color through the field lens 417. On the other hand, the red color light transmits through the dichroic mirror 422 to each the liquid crystal panel 441R for red color through the relay optical system 43 and the field lens 417.

Incidentally, the relay optical system 43 is used for the red color light in order to prevent deterioration of light utilization efficiency on account of light dispersion etc. caused by longer length of the optical path of the red light relative to the optical path length of the other color lights. In other words, the relay optical system 43 is used for directly transmitting the sub-beams incident on the incident-side lens 431 to the field lens 417. Incidentally, though the red light is introduced to the relay optical system 43, the other color light such as the blue light may be guided thereto.

The optical device 44 modulates the light beam incident thereon in accordance with image information to form a color image, which includes an incident-side polarization plate 444 as a polarizer on which the light beam irradiated by the color separating optical system 42 is incident, the three liquid crystal panels 441R, 441G and 441B disposed on the downstream of the optical path of the respective incident-side polarization plates 444 as an optical modulator, an irradiation-side polarization plane 460 disposed on the downstream of the optical path of the liquid crystal panels 441R, 441G and 441B as an analyzer, and a cross dichroic prism 443. The optical components 441, 443 and 460 are integrated to form an optical device body 48. The details of the optical device body 48 will be described below.

The incident-side polarization plate 444 is independent of the optical device body 48. The incident-side polarization plate 444 transmits only a polarized light of the sub-beams separated by the color separating optical systems 42 polarized in a predetermined direction and absorbs the light beam in other direction. Incidentally, the orientation of the polarization axes of the incident-side polarization plane 444 and the irradiation-side polarization plate 460 are orthogonal with each other.

The above-described optical components 41–44 are housed in the light guide 47 made of heat-conductive material as an optical component casing.

Though not illustrated, the light guide 47 has a lower light guide provided with a groove for the above-described optical components 414 to 418, 421 to 423, 431 to 434 and 444 (FIG. 2) to be slidably fitted from the above, and a lid-shaped upper light guide for closing the upper opening of the lower light guide. The light source 413 is accommodated on an end of the planarly-viewed L-shaped light guide 47 and the projection lens 46 is fixed on the other end through a heat 49.

[1-3 Arrangement of Optical Device Body of Optical Device]

Figure 3:
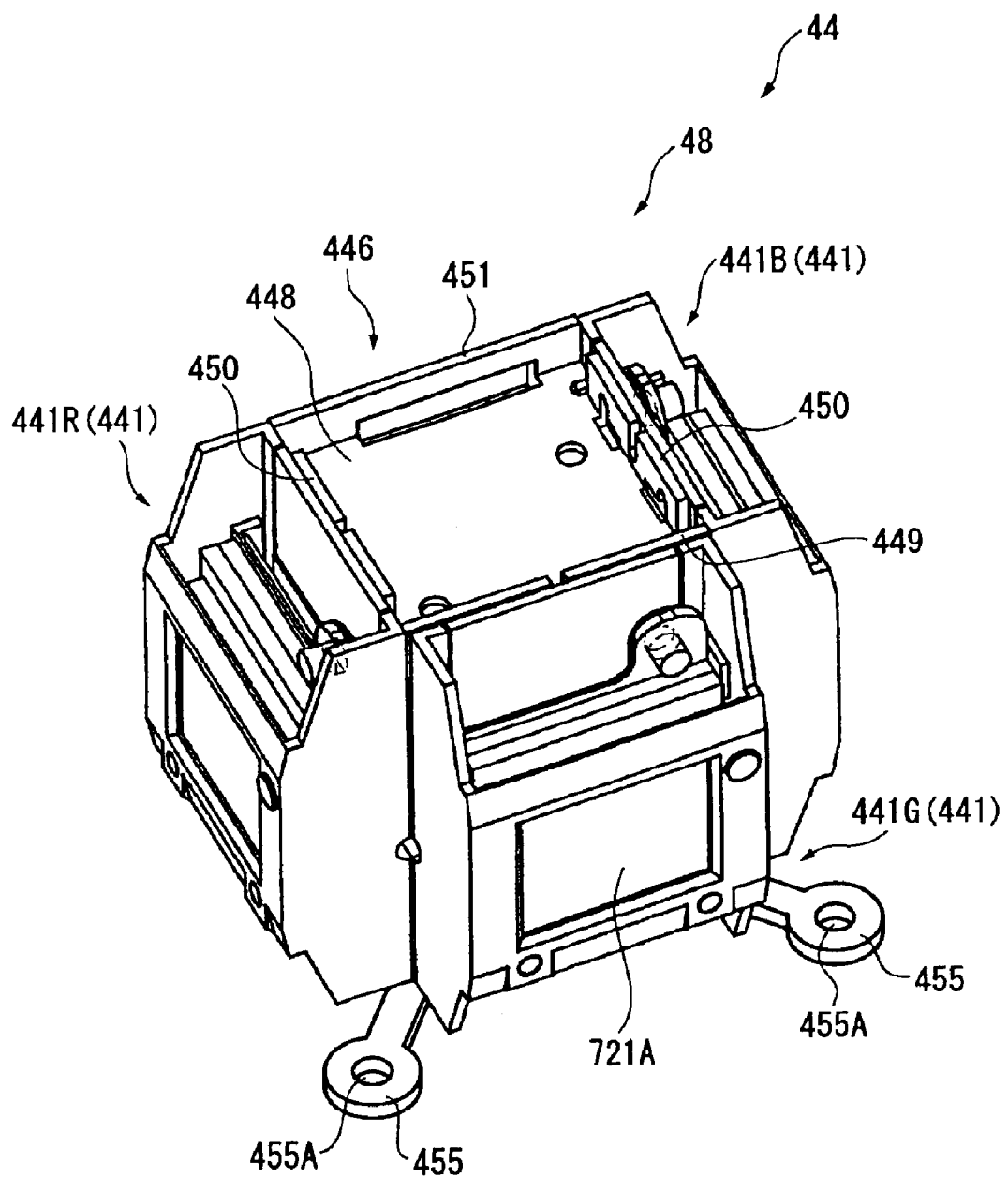
FIG. 3 is a perspective view showing an optical device body of the first embodiment.
Figure 4:
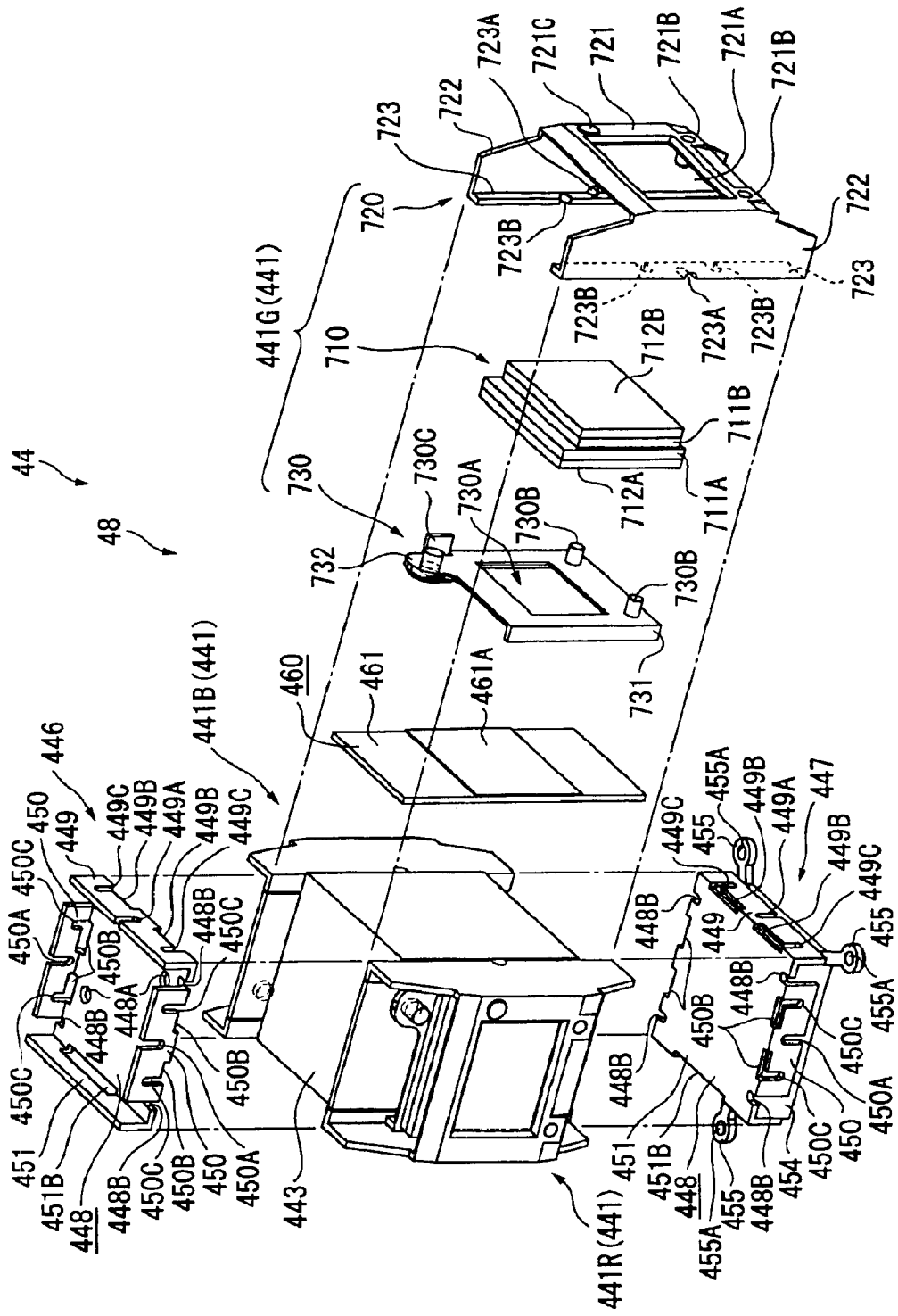
FIG. 4 is an exploded perspective view showing the optical device body of the first embodiment.

FIG. 3 is a perspective view showing the optical device body 48. FIG. 4 is an exploded perspective view of the optical device body 48 of the optical device 44. Incidentally, only the liquid crystal panel 441G is specifically illustrated in FIG. 4 in an exploded manner and the illustration of the other liquid crystal panels 441R and 441B is omitted.

As shown in FIG. 4, the optical device body 48 has the cross dichroic prism 443, an upper base 446, a lower base 447, the irradiation-side polarization plate 460, and the liquid crystal panel 441G (441).

The cross dichroic prism 443 synthesizes the image irradiated by the three liquid crystal panels 441R, 441G and 441B after being modulated for each color light to form a color image, which is constructed as a hexagon, i.e. approximate cube. In the cross dichroic prism 443, a dielectric multi-layer film for reflecting red light and a dielectric multi-layer film for reflecting blue light are arranged approximately in X-shape along the boundary of four right-angle prisms, the dielectric multi-layer film synthesizing the three color lights. The color image synthesized by the cross dichroic prism 443 is irradiated by the projection lens 46 and is projected on a screen in an enlarged manner.

The upper base 446 and the lower base 447 are fixed on the upper and lower sides of the cross dichroic prism 443 intersecting the plurality of light-incident sides of the cross dichroic prism 443. The upper base 446 is made of heat-conductive plate metal and is fixed on the upper side of the cross dichroic prism 443. On the other hand, the lower base 447 is fixed on the lower side of the cross dichroic prism 443.

The upper base 446 has approximately the same outer profile as the upper side of the cross dichroic prism 443, which is made of 42 alloy (manufactured by YAMAHA METANIX CORPORATION: containing 42 wt % of Ni and 58 wt % of Fe, expansion coefficient of $40° 10^{-7}$–$47° 10^{-7}$).

The upper base 446 includes a plate base body 448 mounted on the upper side of the cross dichroic prism 443, and ribs 449, 450 and 451 formed by bending periphery of the base body 448 along the light-incident side of the cross dichroic prism 443 on which the liquid crystal panel 441 is attached at a plurality of locations, the ribs 449, 450 and 451 being vertically mounted on the four peripheries of the base body 448.

Two positioning holes 448A being a blind hole bored approximately in circular shape are formed around the center of the base body 448. The positioning hole 448A is used for locating a jig (not illustrated) used for bonding the base body 448 with the cross dichroic prism 443. A slit 448B is formed on the periphery of the rib 450 of the base body 448.

The ribs 449 and 451 are provided on opposing two sides of the base body 448. The rib 449 is provided on the light-incident side for the liquid crystal panel 441G to be fixed and the rib 451 is provided on a side opposite to the light-incident side on which the liquid crystal panel 441G is fixed. The ribs 449 and 451 are of approximately the same width as the width of the light-incident side.

The rib 449 is provided with one slit 449A formed approximately at the center of the distal end of the projection thereof to divide the plurality of bonding surfaces of the liquid crystal panel 441G (441). The slit 449A stretches from the upper side of the rib 449 in height direction by about half of the height of the rib 449.

Two elongated holes 449B of L-shaped cross section extending along bent portion of the rib 449 are formed on the rib 449 and the base body 448.

The elongated holes 449B are respectively formed around the outer edge of the rib 449 around the slit 449A in an approximately symmetric manner.

Two slits 449C are formed on the outer edge of elongated hole 449B of the rib 449, the slits 449C extending along the edge of the irradiation-side polarization plate 460 to be bonded in a direction of the rib 449 to be projected. The slit 449C stretches from approximately half the height of the rib 449 to the elongated hole 449B.

An elongated hole 451B of L-shaped cross section extending along the bent portion of the rib 451 is formed on the rib 451 and the base body 448.

On the other hand, two ribs 450 are provided on the two sides orthogonal with the side of the base body 448 on which the rib 449 is provided. Two ribs 450 are provided respectively on the light-incident sides on which the liquid crystal panels 441R and the 441B are fixed.

The rib 450 has one slit 450A formed approximately at the center of the distal end of the projection of the rib 450 to divide the attachment surface of the liquid crystal panels 441B and 441R (441) into plural. The slit 450A stretches from the upper side of the rib 450 to approximately half the height of the rib 450.

Two elongated holes 450B of L-shaped cross section extending along the bent portion of the rib 450 are formed on the rib 450 and the base body 448.

The elongated holes 450B are formed on the side of the outer edge of the rib 450 on both sides of the slit 450A approximately in symmetrical manner.

A slit 450C extending along the edge of the irradiation-side polarization plate 460 to be attached in a direction of the projection of the rib is formed on the outer edge of the elongated hole 450B of the rib 450. The slit 450C stretches from approximately half the height of the rib 450 to the elongated hole 450B.

In manufacturing the upperbase 446, a rectangular plate metal is punched in a shape corresponding to the rib 449 etc. and is vertically bent to form the rib 449 etc.

The lower base 447 has approximately the same arrangement as the upper base 446, which has approximately the same outer profile as the lower side of the cross dichroic prism 443 and is made 42 alloy (manufactured by YAMAHA METANIX CORPORATION).

The lower base 447 and the upper base 446 differ in that the lower base 447 has at least two attachments 445 to be fixed with the light guide 47.

Specifically, the attachment 455 extends from a box-shaped body 454. The body 454 has approximately the same outer profile as the base body and is made of heat-conductive material, e.g. 42 alloy (manufactured by YAMAHA METANIX CORPORATION) in the present embodiment.

One of the arm-shaped attachments 455 is provided approximately at the center of one side of the rib 451 of the lower base 447 and on the corners of the side of the rib 449 opposing thereto. The attachment 455 has an attachment hole 455A at the center thereof. The optical device 44 is positioned by the attachment hole 455A and a positioning pin (not illustrated) provided on the light guide 47 to be abutted and fixed on the light guide 47 (FIG. 1) through the attachment 455 of the lower base 447.

The irradiation-side polarization plate 460 is interposed between the liquid crystal panel 441G (441) and the light-incident side thereof, where the edges of the irradiation-side polarization plate 460 are attached to the upper base 446 and the lower base 447, the irradiation-side polarization plate 460 having a polarization film 461A for polarizing the color light irradiated by the liquid crystal panel 441 on a substrate 461.

The substrate 461 may be made of any material having heat-conductivity of 10 W/(m·K) or more, which is rectangular plate made of sapphire glass. Accordingly, the substrate 461 has high heat-conductivity of approximately 40W/(m·K) and high rigidity, so that the substrate 461 is not likely to be damaged and is highly transparent.

When the substrate 461 is made of a material of heat-conductivity of less than 10 W//(m·K), the heat generated on the irradiation-side polarization plate 460 may not be sufficiently transferred to the upper base 446 and the lower base 447.

The substrate 461 has a plating layer capable of being soldered on the sides opposing the upper base 446 and the lower base 447.

The plating layer is made of field-free nickel-phosphorous plating layer and solder plating layer.

The vertical ends (in the drawing) of the substrate 461 of the irradiation-side polarization plate 460 are respectively bonded with the rib 449 of the upper base 446 and the lower base 447, so that the irradiation-side polarization plate 460 is bonded with the rib 449 on the inner side relative to the bonding surface of the liquid crystal panel 441G (441).

The polarization film 461A is formed in approximately square shape on the middle section of the substrate 461 in vertical direction in the drawing in a width approximately the same as the horizontal width of the substrate 461 in the drawing. The polarization film 461A is made by forming a film of polyvinyl alcohol (PVA) in which iodine is absorbed and dispersed, the film being oriented in one direction and an acetate cellulose film being laminated on both sides of the oriented film by an adhesive.

The liquid crystal panel 441G (441) as an optical modulator has a liquid crystal panel body 710 as an optical modulator body, a holding frame 720 and a frame member 730.

The liquid crystal panel body 710 has a pair of transparent substrates 711A and 711B made of glass etc. The pair of transparent substrates 711A and 711B are adherered with a predetermined gap through a sealing member (not illustrated).

Switching element such as TFT element, picture element electrode made of transparent conductive material such as ITO (Indium Tin Oxide), wiring, orientation film etc. are formed inside the transparent substrate 711A. Opposing electrode and orientation film corresponding to the picture element electrode are formed on the inside of the transparent substrate 711B. Accordingly, an active-matrix liquid crystal panel is constructed.

The outer profile of the transparent substrate 711A is greater than the outer profile of the transparent substrate 711B.

Dustproof glasses 712A and 712B for preventing adhesion of dust are respectively closely adhered on the light-irradiation and light-incident sides of the liquid crystal panel body 710. Specifically, the dustproof glasses 712A and 712B are adhered on the outer surface of the pair of transparent substrates 711A and 711B (light-irradiation side and light-incident side). The dustproof glasses 712A and 712B are made of heat-conductive transparent material, e.g. sapphire in the present embodiment. The dustproof glasses 712A and 712B cover the outer surface of the substrate to prevent adhesion of dust. Even when dust is adhered to the outer surface of the dustproof glasses 712A and 712B, since the dust is cut of focus, no shadow is displayed on the projected range.

The outer dimension of the dustproof glass 712A adhered on the transparent substrate 711A is approximately the same as the transparent substrate 711A.

The outer dimension of the dustproof glass 712B adhered on the transparent substrate 711A is approximately the same as the transverse substrate 711B.

The holding frame 720 is a component of approximately C-shaped cross section having a base portion 721 integrated with a pair of lateral portions 722 vertically mounted on the opposing sides of the base portion 721, the holding frame accommodating the liquid crystal panel body 710 thereinside.

The base portion 721 has approximately rectangular shape and a rectangular opening 721A corresponding to the image information area of the liquid crystal panel body 710 is formed at the center thereof.

At least three incident-side dustproof glass positioners for the dustproof glass 712B on the light-incident side are provided on the base portion 721 around the opening 721A.

Figure 5:
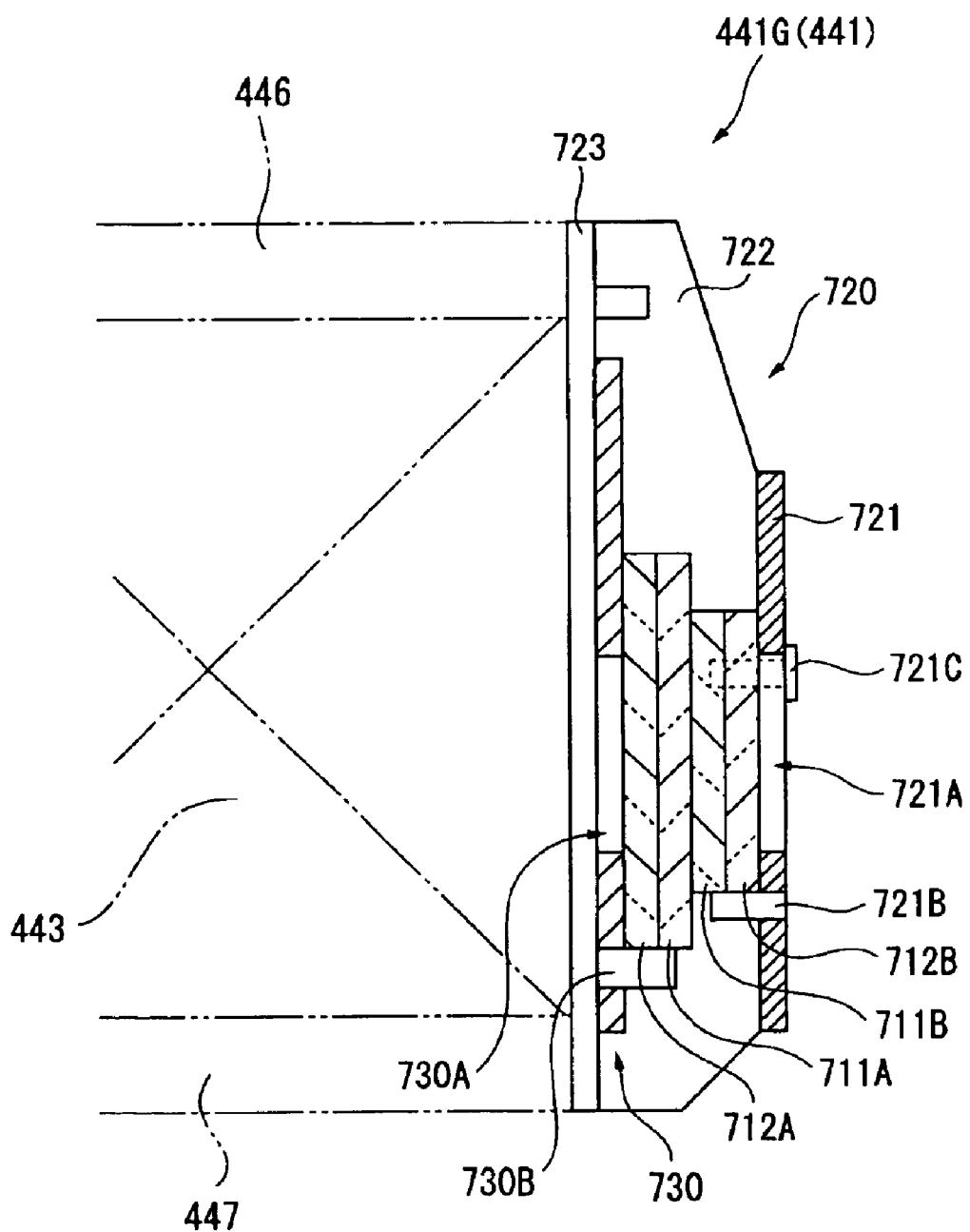
FIG. 5 is a cross section showing the liquid crystal panel of the first embodiment.

In the present embodiment, as shown in FIGS. 4 and 5, the incident-side dustproof glass positioner includes two first positioner 721B to be in contact with the light-incident surface of the dustproof glass 712B and one second positioner 712C to be in contact with a surface orthogonal to the surface of the light-incident dustproof glass 712B to be in contact with the first positioner.

The first positioner 721B is a pin component, which is provided on the lower side (in the drawing) of the opening 712A and on the backside of the base portion 721.

Incidentally, though the first positioner 721B is located on the upstream side of the cooling air introduced from the outside of the liquid crystal panel 441G, the first positioner 721B may preferably be disposed on the downstream side thereof.

The second positioner 721C also is a pin component, which is located on the upper right side of the opening 721A (in the drawing) and on the backside of the base portion 721.

As shown in FIG. 5, the thickness of the first positioner 721B and the second position 721C is equal to the sum of the thickness of the dustproof glass 721B and half of the thickness of the transparent substrate 711B disposed on the light-incident side.

Back to FIG. 4, the lateral portion 722 has an approximately planarly-viewed trapezoid profile, which is consecutive with the base portion 721 at the portion corresponding to an upper base of the trapezoid. A bent rib 723 bent toward the inside of the holding frame 720 is formed on the distal end of the lateral position 722.

One slit 723A as an elongated hole extending from the lateral side to the bent rib 723 is formed approximately at the center of the bent rib 723. The slit 723A stretches from the portion intersecting the lateral portion 722 to approximately half of the projection of the bent rib 723.

Two slits 723B as a pair of notched groove stretching along the extension of the bet rib 723 in a manner mutually spaced apart are disposed on the distal end of the bent rib 723. The slit 723B stretches from the periphery of the bent rib 723 to approximately half of the projection of the bent rib 723.

Incidentally, the holding frame 720 is attached with the upper base 446 and the lower base 447 through the bent rib 723, where the holding frame 720 may be attached by soldering or adhesive etc. During the adhesion process, slight gap is required between the components for adjusting the focus of the liquid crystal panel 441G (441).

The frame member 730 is disposed on the light-irradiation side of the liquid crystal panel body 710 and is made of heat-conductive material. The frame member 730 is made of 42 alloy (manufactured by YAMAHA METANIX CORPORATION) in the present embodiment.

The frame member 730 has a rectangular opening 730A corresponding to the image formation area of the liquid crystal panel body 710 at the center thereof.

Further, the frame member 730 has a pair of bent portion 731 formed at a position opposing the pair of lateral portions 722.

The bent portion 731 projects toward the light-irradiation side and is bonded with the lateral portion 722. The bonding portion may be provided with a gap and solder or heat-conductive adhesive working both for heat-conductance and fixing may be interposed in the gap to fix the best portion 731, thereby improving heat radiation and preventing interference of the pair of lateral portions 722. The frame member 730 has an approximately semicircular projection 732 projecting from the upper right periphery (in the drawing) of the frame member 730.

At least three irradiation-side dustproof glass positioners for the light-irradiation side dustproof glass 712A are provided around the opening 730A of the frame member 730.

As shown in FIGS. 4 and 5, the irradiation-side dustproof glass positioner of the present embodiment includes two first positioners 730B to be in contact with the surface of the light-irradiation side dustproof glass 712A and one second positioner 730C to be in contact with the side orthogonal with the surface of the light-irradiation side dustproof glass 712A to be in contact with the first positioner 730B.

The first positioner 730B is a pin component, which is provided on the lower side (in the drawing) and on the front side of the frame member 730.

Incidentally, though the first positioner 730B of the present embodiment is disposed on the upstream side of the cooling air introduced from the outside of the liquid crystal panel 441G, the first positioner 730B may more preferably be disposed on the disposed downstream side thereof.

The second positioner 730C is formed by bending a part of the frame member 730, which is provided on the projection 732 and the front side of the frame member 730. The second positioner 730C may be a pin component.

As shown in FIG. 5, the thickness of the first positioner 730B and the second positioner 730C is equal to the sum of the dustproof glass 712A and half of the thickness of the transparent substrate 711A disposed on the light-irradiation side.

The process for assembling the liquid crystal panel 441G by the liquid crystal panel body 710, the holding frame 720 and the frame member 730 will be described below with reference to FIG. 5.

Initially, the light-irradiation side dustproof glass 712A is fixed to the frame member 730 after determining the position thereof with reference to the first positioner 730B and the second positioner 730C of the frame member 730, the fixing process being conducted by soldering or, alternatively, heat-conductive adhesive.

Next, the panel body synthesizing the transparent substrates 711A and 712A in advance is superposed on the fixed dustproof glass 712A. The first positioner 730B and the second positioner 730C are used for determining the fixing position of the panel body. Subsequently, the transparent substrates 711A and 711B are fixed on the dustproof glass 712A. Ultraviolet-curing adhesive is used for fixing the transparent substrates, which is cured by irradiating ultraviolet on the adhesive. The fixing process may be conducted using heat-curing adhesive.

Then, the light-incident side dustproof glass 712B is fixed on the holding frame 720 after determining the position thereof with reference to the first positioner 721B and the second positioner 721C of the holding frame 720, the fixing process being conducted by soldering. The fixing process may alternatively be conducted using a heat-conductive adhesive.

Finally, the transparent substrate 711B is superposed on the fixed dustproof glass 712B. The position of the transparent substrate 711B is determined with reference to the first positioner 721B and the second positioner 721C. Ultraviolet-curing adhesive is used for fixing the transparent substrate 711B, which is cured by irradiating ultraviolet on the adhesive. The fixing process may alternatively be conducted using a heat-curing adhesive.

Next, air-cooling mechanism provided on the projector 1 will be described below. As shown in FIG. 1, the projector 1 has an optical device cooling system A mainly for cooling the optical device 44 (FIG. 2), a light source cooling system B mainly for cooling the optical device 413, and a power source cooling system C mainly for cooling the power source unit 3.

The optical device cooling system A has a non-illustrated intake hole formed on the lower side of the exterior case 2, the axial-flow intake the 51 disposed above the intake hole, and an opening 4B provided on the bottom side of the light guide 47 above the axial-flow intake fan 51.

The fresh cooling air outside the projector 1 is drawn in by the intake hole of the exterior case 2 by the axial flow intake fan 51, which enters into the light guide 47 through the opening 4B. Though not shown, a rectifying plate is provided on the low side of the light guide 47, so that the cooling air inside the light guide 47 flows from the lower side to upper side.

The cooling air introduced into the light guide 47 is rectified to flow from the lower side of the optical device 44 to the upper side, which passes the backside of the liquid crystal panel 441G to flow to the upper side of the optical device body 48 while cooling the upper base 446, the irradiation-side polarization plate 460, the liquid crystal panel 441G and the incident-side polarization plate 444.

In the optical device cooling system A, the circulating cooling air not only cools the optical device 44 but also blows off the dust deposited on the surface of the liquid crystal panels 441R, 441G and 441B. Accordingly, the surface of the liquid crystal panels 441R, 441G and 441B can be always kept clean, thereby securing stable image quality.

As shown in FIG. 1, the light source cooling system B has the sirocco fan 52, the duct 52A and the exhaust hole 2B. In the light source coding system B, the cooling air passing through the optical device cooling system A is drawn in by the sirocco fan 52 and enters into the light source 413 to cool the light source lamp 411, which goes out of the light guide 47 to be discharged to the outside passing through the duct 52A.

The power source cooling system C has the axial-flow exhaust fan 53 provided around the power source unit 3 and the exhaust hole 2C. In the power source cooling system C, the air warmed by the heat of the power source unit 3 is drawn by the axial-flow exhaust fan 53 to be discharged from the exhaust hole 2C. At this time, the air in the entirety of the inside of the projector 1 is simultaneously discharged so that the best does not stay inside the projector 1.

[1-5. Advantages of First Embodiment]

According to the above first embodiment, following advantages can be obtained (1) The liquid crystal panel body 710 is accommodated inside the holding frame 720 having the pair of lateral portions 722 and is spaced apart from the irradiation-side polarization plane 460 by the lateral portions 722.

Accordingly, the liquid crystal panel 441G (441) can be efficiently cooled by the flowing a cooling air between the liquid crystal panel 441G (441) and the irradiation-side polarization pole 460. Further, since the irradiation-side polarization plate 460 does not touch the liquid crystal panel body 441G (441) by the presence of the holding frame 720 having the pair of lateral portions 722, heat does not directly transfer between the components, thus efficiently cooling the liquid crystal panel 441G (441). Further, since the dustproof glass 712A and the dustproof glass 712B are fixed to the frame member 730 and the holding frame 720 in a manner capable of direct heat conduction using a highly heat-conductive member, heat can be directly radiated from both the incident-side and the irradiation side without any intermediary. In addition, the pair of lateral portions 722 work as a large heat sink for the liquid crystal panel 441G (441) and the irradiation-side polarization plate 460, so that heat radiation by the cooling air can be efficiently cooled.

(2) Since the heat generated by the liquid panel body 710 is transferred to the frame member 730 and the heat can be released to the holding frame 720 through the bent portion 731 of the frame member 730, the liquid crystal panel body 710 can be efficiently cooled.

(3) Since the dustproof glasses 712A and 712B are made of heat-conductive transparent material (sapphire), the heat generated by the liquid crystal panel body 710 can be transferred to the holding frame 720 through the dustproof glasses 712A and 712B, so that the liquid crystal panel body 710 can be more difficult cooled.

(4) Since the position of the dustproof glass 712B and be bidirectionally determined by the first positioner 721B to be in contact with the lower side of the dustproof glass 712 and the second positioner 712B to be in contact with a side orthogonal with the side of the light-incident side dustproof glass 712B on which the first positioner 712B touches, the dustproof glass 712B can be securely positioned and fixed. When the first positioner 712B is located on the downstream of the cooling air introduced from the outside of the liquid crystal panel 441G (441), the flow of the cooling air is not hindered, thereby efficiently cooling the liquid crystal panel body 710.

(5) Since the first positioner 721B and the second positioner 721C as the incident-side dustproof glass positioner can be in contact with both the transparent substrate 711B and the light-incident side dustproof glass 712B, position shift of the transparent substrate 711B relative to the dustproof glass 712B can be prevented.

(6) Since the position of the dustproof glass can be bidirectionally determined by the first positioner 730B touching the lower side of the dustproof glass 712A and the second positioner 730C touching the upper side opposing the light-irradiation side dustproof glass, the dustproof glass can be securely positioned and fixed. Further, when the first positioner 730B is located on the downstream of the cooling air introduced from the outside of the liquid crystal panel 441G (441), the flow of the cooling air is not hindered, so that the liquid crystal panel body 710 can be efficiently cooled.

(7) Since the first positioner 730B and the second positioner 730C as the irradiation-side dustproof of glass positioner can be in contact with the transparent substrate 711A and the light-irradiation side dustproof glass 712A, the position shift between the transparent substrate 711A and the dustproof glass 712A can be prevented.

(8) The provision of the bent rib 723 increases the contact area between the upper base 446 and the lower base 447. Accordingly, the heat generated in the liquid crystal panel body 710 can be efficiently transferred to the outside of the liquid crystal panel 441G (441), so that the liquid crystal panel 441G (441) can be efficiently cooled.

(9) Since the slit 723B is formed, even when the holding frame 720 expends on account of external heat, the thermal stress can be reduced by the slit 723B, thus preventing the stress from being applied on the liquid crystal panel body 710 inside the holding frame 720.

(10) The position of the liquid crystal panel 441G (441) of the irradiation-side polarization plate 460 can be determined by the slit 723B as a pair of notched grooves. Accordingly, no jig etc. is required for determining the position thereof, thus simplifying the production process.

(11) Even when the upper base 446 and the lower base 447 are expanded by external heat, since the stress on account of the heat can be absorbed by the slits 448B, 449A, 449C and 450A, the position of the upper base 446 relative to the irradiation-side polarization plate 460 and the liquid crystal panel 441G (441) attached to the lower base 447 is not altered. Accordingly, the position shift of the liquid crystal panel 441G (441) relative to the light-incident side cam be securely prevented.

(12) The elongated hole 451B allows the flow of the cooling air from the outside of the optical device 44, thus efficiently cooling the optical device 44.

(13) Since at least two attachments 455 are provided, the contact area between the optical device 44 and the light guide 47 can be increased and the heat generated by the optical device 44 can be efficiently transferred to the light guide 47, thus efficiently cooling the optical device 44.

(14) Since the optical device 44 is attached and fixed to the light guide 47 at three locations by the attachment 455, the optical device 44 can be securely fixed to the light guide 47.

(15) Since the heat generated on the irradiation-side polarization plate 460 can be transferred to the upper base 446 and the lower base 447 by the substrate 461 being fixed to the upper base 446 and the lower base 447, the irradiation-side polarization plate 460 can be further efficiently cooled.

(16) Since the field-free nickel-phosphorus plating layer can be formed with uniform thickness, anti-corrosion and anti-friction properties can be improved.

[2. Second Embodiment]

Next, a projector according to a second embodiment of the present invention will be described below with reference to attached drawings. The projector according to the second embodiment differs from the projector 1 according to the first embodiment in the arrangement of the upper base 446 and the lower base 447 as a part of the optical device body 48. Accordingly, the same reference numeral will be attached to the components identical with or corresponding to the components of the first embodiment to omit or simplify the description thereof.

[2.1. Primary Arrangement]

Figure 6A:
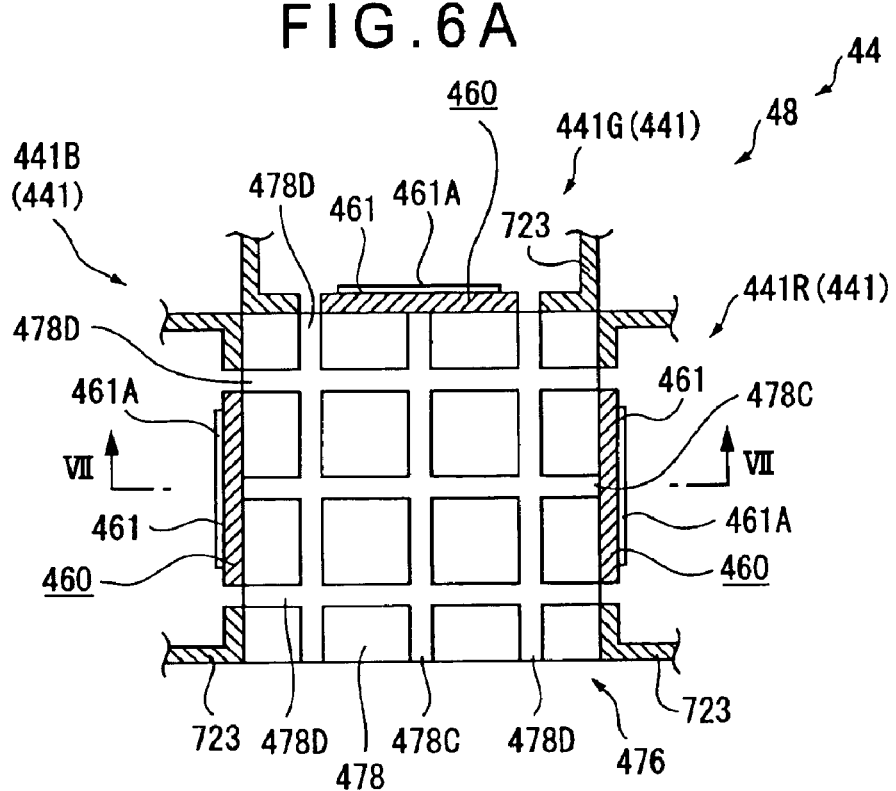
FIGS. 6A and 6B are plane views showing upper and lower sides of the optical devices body according to a second embodiment of the present invention.
Figure 6B:
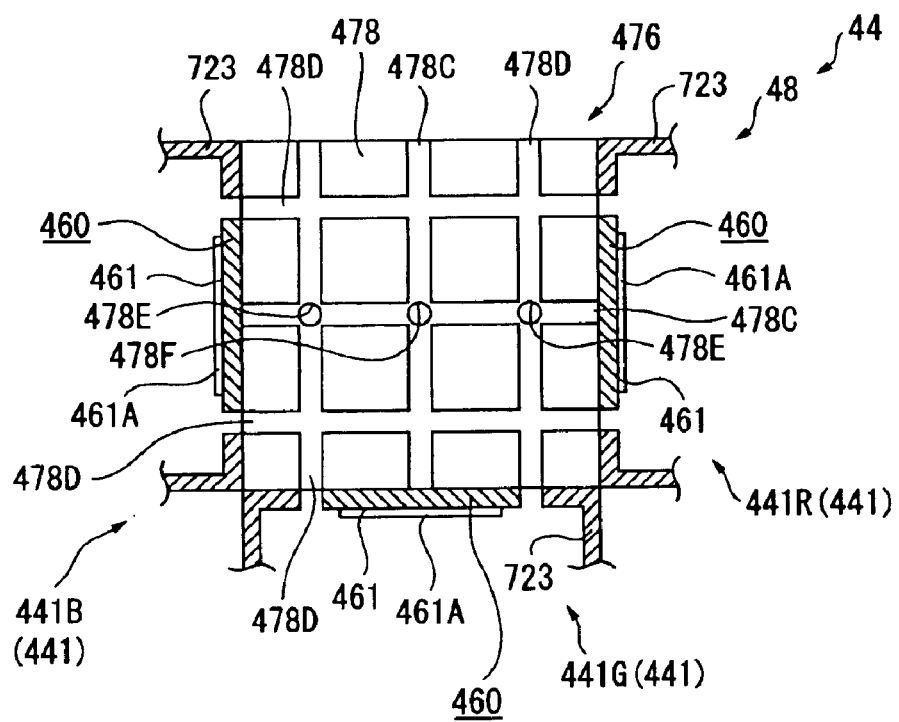

FIG. 6 is a plane view showing the upper side and lower side the optical device body 48. Specifically, FIG. 6(A) illustrates the upper side of the optical device body 48 and FIG. 6(B) illustrates the lower side of the optical device body 48.

Figure 7:
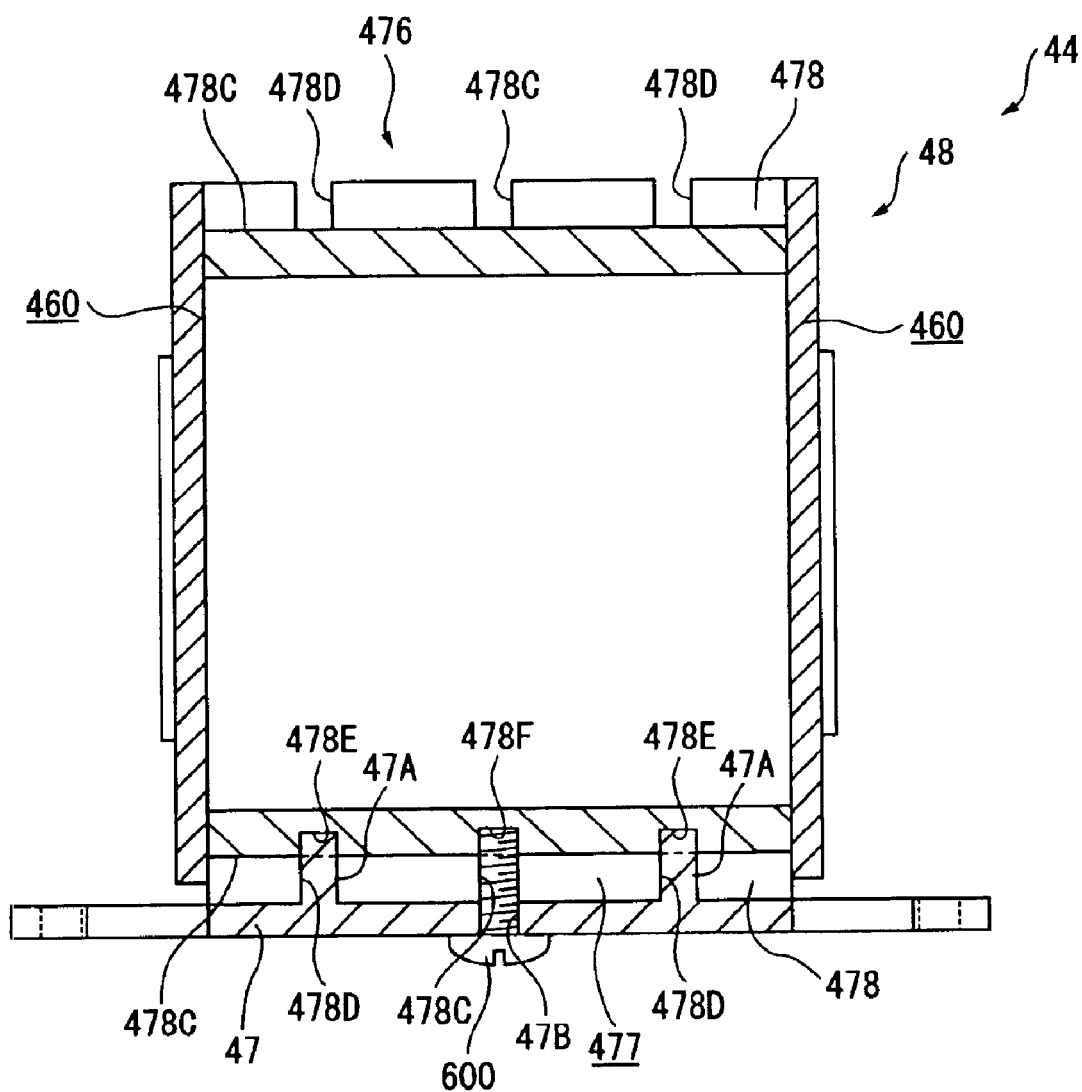
FIG. 7 is a cross section showing the optical device body of the second embodiment being attached to a light guide.

FIG. 7 is a cross section showing the optical device body 48 being attached to the light guide 47. Specifically, FIG. 7 is a cross section taken along VII—VII line in FIG. 6.

As shown in FIG. 4, the lower base 447 of the first embodiment is provided with the attachment 455.

On the other hand, an upper base 476 and a lower base 477 of the second embodiment have no attachment 455 as shown in FIGS. 6 and 7.

Further, the upper base 466 and the lower base 447 of the first embodiment have the approximately rectangular base body 448, and ribs 449, 450 and 451 vertically provided from the four sides of the base body 448.

On the other hand, the upper base 476 and the lower base 477 of the second embodiment are composed of a base body 478 as a rectangular parallepiped block as shown in FIGS. 6 and 7. The base body 478 employs a material having heat-conductivity similar to glass such as the above-described 42 alloy (manufactured by YAMAHA METANIX CORPORATION).

As shown in FIGS. 6(A) and (B), a groove 478C extending along the side of the cross dichroic prism on which the upper base 476 and the lower base 477 are fixed and defining a plurality of attachment surface for the liquid crystal panel 441G (441) at an end thereof is formed on the upper base 476 and the lower base 477 of the second embodiment. The groove 478C is formed at the center of the attachment surface of the upper base 476 and the lower base 477.

As shown in FIGS. 6(A) and (B), a groove 478D as a second groove extending along the side of the cross dichroic prism on which the upper base 476 and the lower base 477 are fixed and dividing the attachment surface for the liquid crystal panel 441G (441) and the attachment surface for the irradiation-side polarization plate 460 at an end thereof is formed on the upper base 476 and the lower base 477.

The irradiation-side polarization plate 460 is attached to the inner side of the plurality of attachment surfaces for the liquid crystal panel 441G (441) divided by the groove 478D.

The bent rib 723 is attached on the outside of the plurality of attachment surfaces for the liquid crystal panel 441G (441) divided by the groove 478D.

Further, as shown in FIG. 6(B), guide holes 478E for guiding the optical device body 48 relative to the light guide 47 are formed on two positions intersecting the two grooves 478D extending from the liquid crystal panel 441G to the light-irradiation side, and a screw hole 478F for fixing the optical device body 48 to the light guide 47 is formed at a position intersecting with the groove 478C extending from the liquid crystal panel 441G to the light-irradiation side.

As shown in FIG. 7, the optical device body 48 is correctly positioned relative to the light guide 47 by fitting a positioning projection 47A of the light guide 47 to the guide hole 478E and is fixed to the light guide 47 by screwing a screw 600 into the screw hole 478F through the fixing hole 47B of the light guide 47.

[2.2. Advantages of Second Embodiment]

According to the above second embodiment, the following advantages along with the advantages of the first embodiment can be obtained.

(17) Even when the upper base 476 and the lower base 477 are expanded on account of external heat, the stress on account of the heat can be reduced by the groove 478C dividing the plurality of attachment surfaces of the optical modulator, so that the relative position of the irradiation-side polarization plate 460 and the liquid crystal panel 441G (441) attached to the upper base 476 and the lower base 477 is not shifted. Accordingly, position shift of the liquid crystal panel 441G (441) relative to the light-incident surface can be securely prevented.

(18) The irradiation-side polarization plate 460 does not directly touch the liquid crystal panel 441G (441) since the attachment surface of the liquid crystal panel 441G (441) and the attachment surface of the irradiation-side polarization plate 460 are divided by the groove 478D. Accordingly, the heat is not directly transferred between the irradiation-side polarization plate 460 and the liquid crystal panel 441G (441), thereby efficiently cooling the irradiation-side polarization plate 460 and the liquid crystal panel 441G (441).

(19) Since the optical device 44 is guided to a predetermined position inside the light guide 47 the guide hole 478E and is screwed to the light guide 47 through the screw hole 478F, the optical device 44 can be securely positioned onto the light guide 47.

[3. Third Embodiment]

Next, a projector according to a third embodiment of the present invention will be described below with reference to attached drawings. The projector according to the third embodiment differs from the projector 1 of the first embodiment in a part of the arrangement of the optical device body 48. Accordingly, the same reference numeral will be attached to the components identical with or corresponding to the components of the first embodiment to omit or simplify the description thereof.

3-1. Primary Arrangement]

As shown in FIG. 4, the liquid crystal panel 441G (441) of the first embodiment has the slits 723A and 723B on the bent rib 723, the position of the slits 723A and 723B being not specifically limited to except for the above description and the slits 723A and 723B being provided for mitigating the stress on account of external heat.

Figure 8:
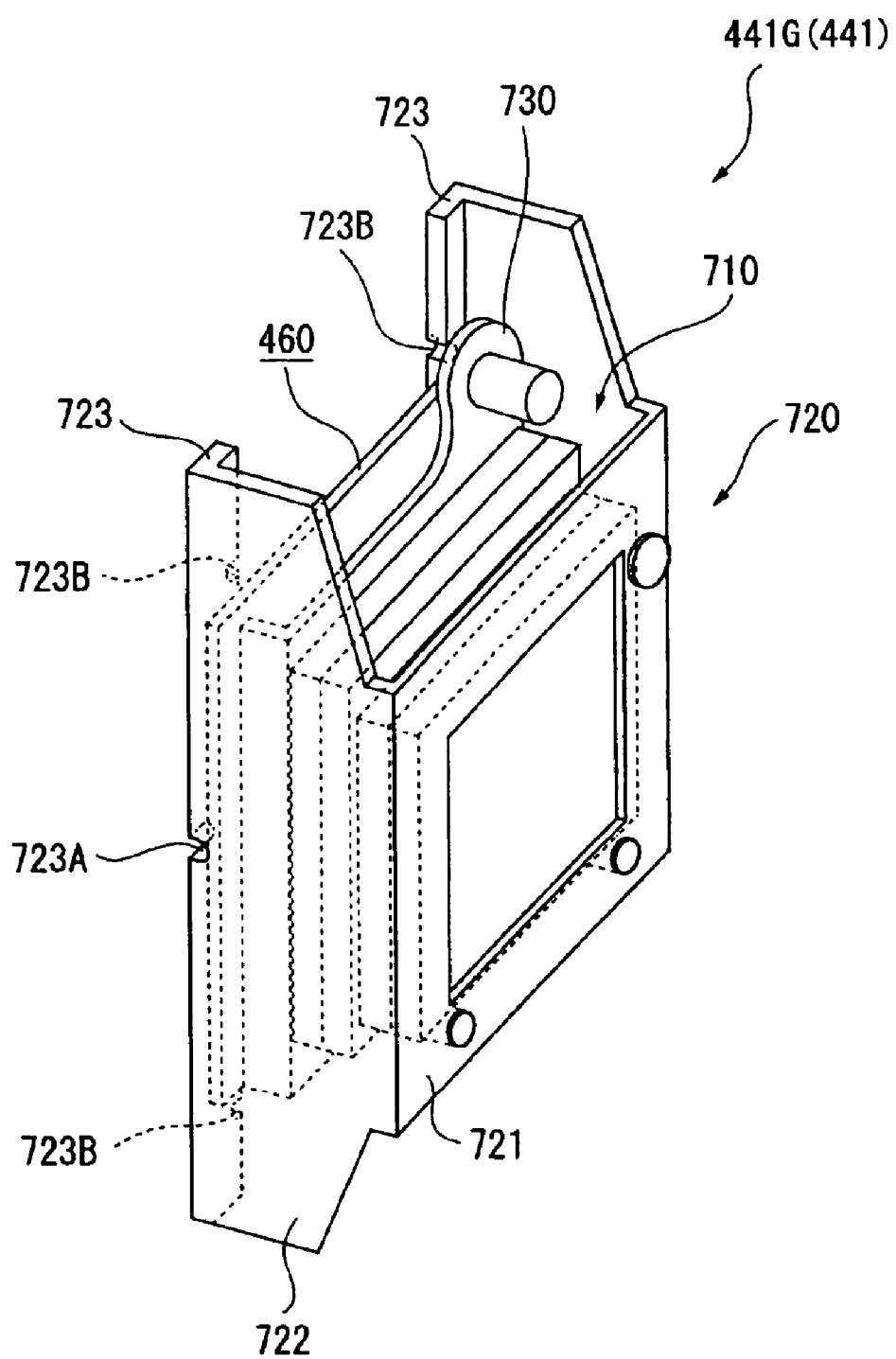
FIG. 8 is a perspective view showing an outline of the optical device of an optical modulator according to a third embodiment of the present invention.

On the other hand, as shown in FIG. 8, vertical inner end of the two slits 723B of the bent rib 723 in the liquid crystal panel 441G (441) of the third embodiment corresponds to the vertical end of the irradiation-side polarization plate 460.

In the liquid crystal panel 441G (441) of the first embodiment, the bent rib 723 and the irradiation-side polarization plate 460 are located approximately on the same plane as shown in FIG. 4.

Figure 9:
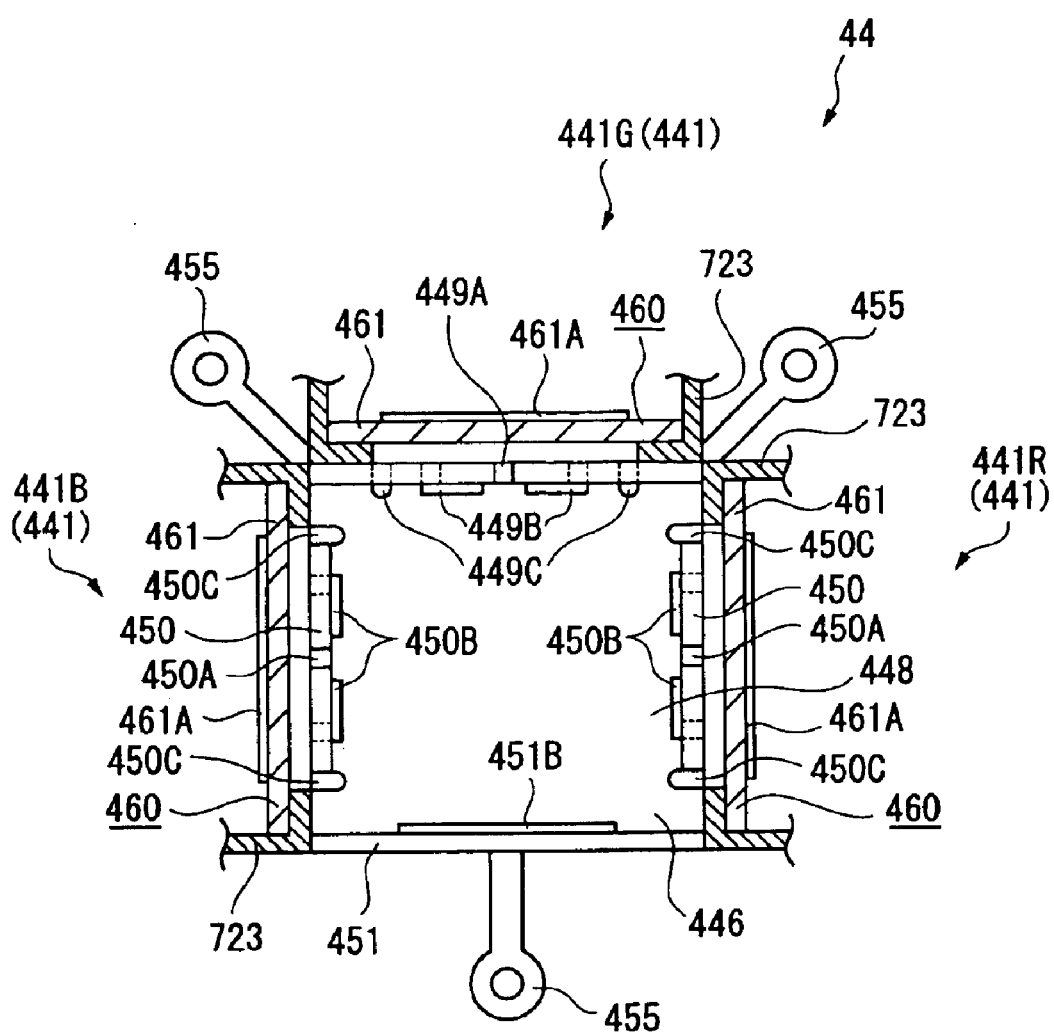
FIG. 9 is a plane view showing an optical device body according to a third embodiment.

On the other hand, as shown in FIGS. 8 and 9, the irradiation-side polarization plate 460 of the liquid crystal panel 441G (441) of the third embodiment is fixed on the inner side of the bent rib 723, i.e. on the light-incident side.

[3-2. Advantage of Third Embodiment]

According to the above-described third embodiment, following advantage can be obtained as well as the advantage of the first embodiment.

(20) Since the vertical inner ends of the slit 723B correspond to the vertical ends of the irradiation-side polarization plate 460, the irradiation-side polarization plate 460 can be easily positioned relative to the liquid crystal panel 441G (441), thereby simplifying the production process.

[4. Modifications]

Incidentally, the scope of the present invention is not restricted to the above embodiments but includes other arrangements as long as an object of the present invention can be achieved, which includes the following modifications.

Though the upper base 446 and the lower base 447 of the above-described embodiments are made of 42 alloy (manufactured by YAMAHA METANIX CORPORATION), the upper base 446 and the lower base 447 may be made of other alloy of aluminum, magnesium, copper and steel, or may be made of Koval (manufactured by Westinghouse Electric Company: containing 29 wt % of Ni, 17 wt % of Co and 54 wt % of Fe, expansion coefficient $46° 10^{-7} – 56° 10^{-7}$) or Femico. These materials have expansion coefficient similar to the expansion coefficient of glass.

Though the substrate 461 of the above-described embodiments is made of sapphire, the substrate 461 may be made of crystal and silica glass.

Though the holding frame 720 of the above-described embodiments is made of 42 alloy (manufactured by YAMAHA METANIX CORPORATION), the holding frame 720 may be made of other alloy of aluminum, magnesium, copper and steel, or may be made of Koval or Femico.

Though the frame member 730 of the above-described embodiments is made of 42 alloy (manufactured by YAMAHA METANIX CORPORATION), the frame member 730 may be made of other alloy of aluminum, magnesium, copper and steel, or may be made of Koval or Femico.

Though the dustproof glasses 712A and 712B of the above described embodiments are made of sapphire, the dustproof glasses 712A and 712B may be made of crystal or silica glass.

The first positioner 721B and the second positioner 721C may be constructed in any manner as long as the thickness thereof is not less than the sum of the thickness of the dustproof glass 712B and half of the transparent substrate 711B disposed on the light-incident side and less than the sum of the thickness of the transparent substrate 711B and the dustproof glass 712B.

The first positioner 730B and the second positioner 730C may be constructed in any manner as long as the thickness thereof is not less than the sum of the thickness of the dustproof glass 712A and half of the transparent substrate 711A disposed on the light-irradiation side and less than the sum of the thickness of the transparent substrate 711A and the dustproof glass 712A.

Though the irradiation-side polarization plate 460 of the liquid crystal panel 441G (441) of the third embodiment is fixed on the inside, i.e. the light-incident side, of the bent rib 723, the irradiation-side polarization plate 460 may be fixed on the outside of the bent rib 723, i.e. on the light-irradiation side.

What is claimed is:

1. An optical modulator that modulates a light beam irradiated by a light source in accordance with image information, comprising:
   an optical modulator body having a pair of transparent substrates between which an electro-optic material is sealed;
   a holding frame that houses the optical modulator body thereinside, the holding frame having an approximately C-shaped cross section constructed by a base portion having an opening corresponding to an image formation area of the optical modulator body and a pair of lateral portions vertically provided on opposing sides of the base portion; and
   a bent rib bent toward the inside of the holding frame formed on a distal end of at least one of the lateral portions of the holding frame.

2. The optical modulator according to claim 1,
   wherein a dustproof glass that prevents adhesion of dust is closely attached to at least one of a light-incident side and the light-irradiation side of the optical modulator body, the dustproof glass being made of a heat-conductive transparent material.

3. The optical modulator according to claim 2,
   wherein at least three incident-side dustproof glass positioners for the dustproof glass on the light-incident side are provided around the opening of the holding frame.

4. The optical modulator according to claim 3,
   wherein the incident-side dustproof glass positioner includes two first positioners located on a downstream of a cooling air introduced from the outside of the optical modulator to be in contact with the surface of the dustproof glass on the light-incident side, and a second positioner to be in contact with a side of the light-incident side dustproof glass orthogonal with the surface of the light-incident side dustproof glass touching the first positioners.

5. The optical modulator according to claim 3,
   wherein the incident-side dustproof glass positioner has a thickness not less than the sum of the half of the thickness of the transparent substrate located on the light-incident side and the thickness of the dustproof glass and less than the sum of the thickness of the transparent substrate and the thickness of the incident-side dustproof glass.

6. The optical modulator according to claim 2,
   wherein at least three irradiation-side dustproof positioners for the dustproof glass on the light-irradiation side are provided around the opening of the frame member.

7. The optical modulator according to claim 6,
   wherein the irradiation-side dustproof positioner includes two first positioners located on a downstream of a cooling air introduced from the outside of the optical modulator to be in contact with the surface of the light-irradiation side dustproof glass and a second positioner to be in contact with a side of the light-irradiation side dustproof glass orthogonal with the surface of the light-irradiation side dustproof glass touching the first positioners.

8. The optical modulator according to claim 6,
   wherein the thickness of the irradiation-side dustproof glass positioner is not less than the sum of half of the thickness of the transparent substrate located on the light-irradiation side and the thickness of the light-irradiation side dustproof glass and is less than the sum of the thickness of the transparent substrate and the thickness of the light-irradiation side dustproof glass.

9. The optical modulator according to claim 1,
   wherein an elongated hole extending from the lateral portion to the bent rib is formed approximately at the center of the holding frame.

10. The optical modulator according to claim 1,
    wherein a pair of notched grooves spread apart along the extending direction of the bent rib are formed on the distal end of the bent rib, the pair of notched grooves determining a location of an optical converter disposed on a downstream of the optical modulator, the optical converter optically converting the irradiated light beam.

11. A projector that modulates a light beam irradiated by a light source in accordance with image information and forms an optical image to project the optical image in an enlarged manner, comprising: the optical modulator according to claim 1.

12. The optical modulator according to claim 1, wherein a bent rib is formed on a distal end of each lateral portion.

13. An optical modulator that modulates a light beam irradiated by a light source in accordance with image information, comprising:
    an optical modulator body having a pair of transparent substrates between which an electro-optic material is sealed;
    a holding frame that houses the optical modulator body thereinside, the holding frame having an approximately C-shaped cross section constructed by a base portion having an opening corresponding to an image formation area of the optical modulator body and a pair of lateral portions vertically provided on opposing sides of the base portion;
    a frame member disposed on a light-irradiation side of the optical modulator body and having an opening corresponding to the image formation area of the optical modulator body, the frame member having a pair of bent portions formed at a position opposing the pair of lateral portions, the lateral portions and the bent portions being abutted and bonded.

14. An optical device, corresponding a plurality of optical modulators that respectively modulate a plurality of color lights in accordance with image information;
a color synthesizing optical device having a plurality of light-incident sides opposing the respective optical modulators, the color synthesizing optical device synthesizing the respective color lights modulated by the respective optical modulators;
a base made of heat-conductive material fixed on at least one of sides of the color synthesizing optical device intersecting the plurality of light-incident sides of the color synthesizing optical device; and
an optical converter interposed between an optical modulator and the light-incident side, the optical converter having an end attached to the base and an optical conversion film provided on a substrate, the optical conversion film optically converting the color light irradiated by the optical modulator,
wherein the optical modulator comprises,
an optical modulator body having a pair of transparent substrates between which an electro-optic material is sealed; and
a holding frame that houses the optical modulator body thereinside, the holding frame having an approximately C-shaped cross-section constructed by a base portion having an opening corresponding to an image formation area of the optical modulator body and a pair of lateral portions vertically provided on opposing sides of the base portion.

15. The optical device according to claim 14,
wherein the base has a plate-shaped base body disposed on the side of the color synthesizing optical device and a plurality of ribs formed by bending sides of the base body along the light-incident sides of the color synthesizing optical device on which the optical modulator is attached at a plurality of locations,
wherein one or more slit that divides a plurality of attachment surfaces of the optical modulator is formed on a distal end of the projection of the respective ribs.

16. The optical device according to claim 15, wherein an elongated hole extending along the bent portion of the rib is formed on the base.

17. The optical device according to claim 16, wherein the optical converter is attached to the rib on the inside of the attachment surfaces of the optical modulator,
wherein the external end of the elongated hole is bent in a direction for the rib to be projected along the end of the attached optical converter.

18. The optical device according to claim 14, wherein the base has at least two attachments used for fixing the base to an optical component casing in which an illuminating optical axis of the light beam irradiated by the light source is set and the optical device is accommodated and disposed at a predetermined position on the illuminating optical axis.

19. The optical device according to claim 18,
wherein one of the attachments is provided approximately at the center of a first side of the base and is respectively provided on corners of a second side opposing the first side.

20. The optical device according to claim 14,
wherein the base is a block member having a plurality of surfaces on which the optical modulator and the optical converter are attached.

21. The optical device according to claim 20,
wherein the optical modulator is bonded on the surface of the base at a plurality of locations, and
wherein a groove extending along the side of the color synthesizing optical device on which the base is fixed and having an end dividing the plurality of surfaces for the optical modulator to be attached is formed on the base.

22. The optical device according to claim 21,
wherein the optical converter is attached on the inner side of the plurality of surfaces on which the optical modulator is attached,
wherein a second groove extending along the side of the color synthesizing optical device on which the base is fixed and having an end dividing the attachment surface of the optical modulator and the attachment surface of the optical converter is formed on the base.

23. The optical device according to claim 20,
wherein the base has a guide hole and a screw hole for the base to be guided and fixed to an optical component casing in which an illuminating optical axis of the light beam irradiated by the light source is set and the optical device is accommodated and disposed at a predetermined position on the illuminating optical axis,
wherein the screw hole is formed approximately at the center of the base.

24. The optical device according to claim 14,
wherein the substrate is provided with a plating layer adapted to soldering at least on a surface opposing the base.

25. The optical device according to claim 24,
wherein the plating layer is made of a field-free nickel-phosphorus plating layer and a solder-plating layer.

26. The optical device according to claim 14,
wherein the substrate is made of material with heat-conductivity of 10W/(m·K) or more.

27. A projector that modulates a light beam irradiated by a light source in accordance with image information and forms an optical image to project the optical image in an enlarged manner, comprising the optical device according to claim 14.

* * * * *